United States Patent
Fuerst et al.

(10) Patent No.: US 6,643,051 B1
(45) Date of Patent: Nov. 4, 2003

(54) METHOD AND SYSTEM FOR GENERATING RETURN-TO-ZERO SIGNALS

(75) Inventors: Cornelius Fuerst, Munich (DE); Harald Geiger, Neuried (DE); Reinhold Noe, Paderborn (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/979,883

(22) PCT Filed: May 17, 2000

(86) PCT No.: PCT/DE00/01564
§ 371 (c)(1),
(2), (4) Date: May 17, 2002

(87) PCT Pub. No.: WO00/73847
PCT Pub. Date: Dec. 7, 2000

(30) Foreign Application Priority Data

May 27, 1999 (DE) .......................... 199 24 347
Jul. 30, 1999 (DE) .......................... 199 36 075

(51) Int. Cl.⁷ ...................... G02F 1/01; H04B 10/04
(52) U.S. Cl. .................. 359/279; 398/183; 398/185; 398/189; 398/188
(58) Field of Search .................. 359/279, 180–184, 359/188, 124, 186, 187; 372/26, 29, 38, 12; 385/3; 398/79, 182, 183, 187, 188, 189, 191, 200

(56) References Cited

U.S. PATENT DOCUMENTS

| | | | | |
|---|---|---|---|---|
| 4,505,587 A | | 3/1985 | Haus et al. ................. 356/478 |
| 5,303,079 A | * | 4/1994 | Gnauck et al. ............. 398/182 |
| 5,434,693 A | | 7/1995 | Tanaka et al. ............. 398/192 |
| 5,805,321 A | * | 9/1998 | Ooi et al. ....................... 398/98 |
| 6,072,615 A | * | 6/2000 | Mamyshev ................. 398/185 |
| 2002/0109893 A1 | * | 8/2002 | Givehchi ..................... 398/183 |
| 2003/0002118 A1 | * | 1/2003 | Givehchi ..................... 398/183 |
| 2003/0030882 A1 | * | 2/2003 | Garrett et al. .............. 359/246 |

FOREIGN PATENT DOCUMENTS

| | | |
|---|---|---|
| DE | 44 41180 C1 | 11/1994 |
| JP | 04129353 | 4/1992 |
| WO | WO 96/31029 | 10/1996 |
| WO | WO 99/08406 | 9/1999 |

OTHER PUBLICATIONS

"Optical Short Pulse Generation by Double Gate Operation of Tandem Connected Electroabsorption Modulators Driven by Sinusoidal Voltages" by H. Tanaka et al., *Electronic Letters*, Aug. 5, 1993, vol. 29, No. 16.

* cited by examiner

*Primary Examiner*—Georgia Epps
*Assistant Examiner*—Jack Dinh
(74) *Attorney, Agent, or Firm*—Morrison & Foerster LLP

(57) ABSTRACT

For the purpose of optical transmission, narrow pulses are generated with the aid of at least two modulators (M1, M2), in which use is made of drive signals (TS1, TS2) of the same frequency with different amplitudes, the modulators having different working points.

9 Claims, 4 Drawing Sheets

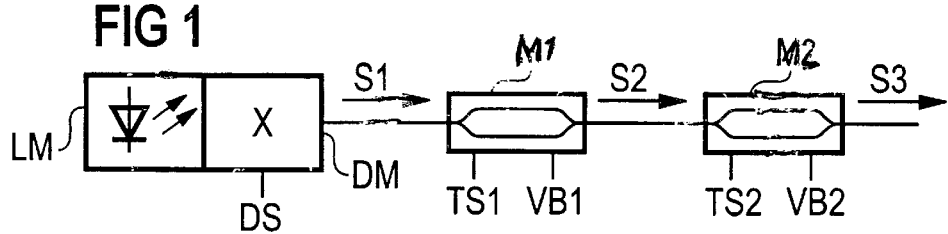
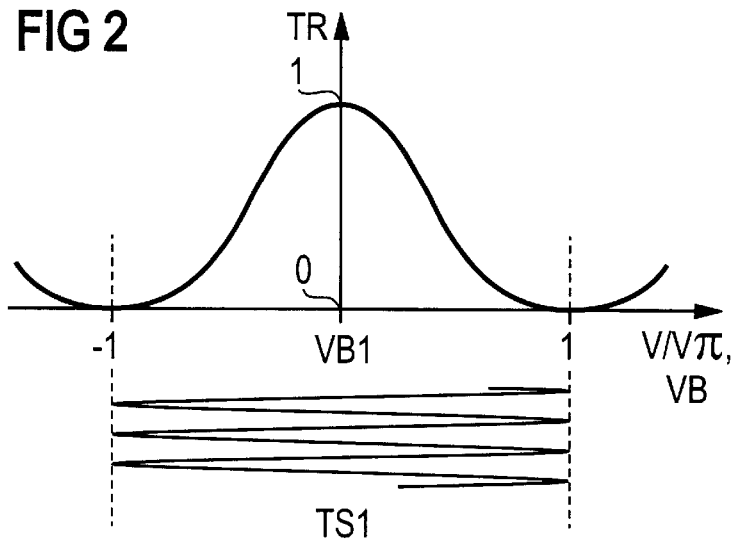
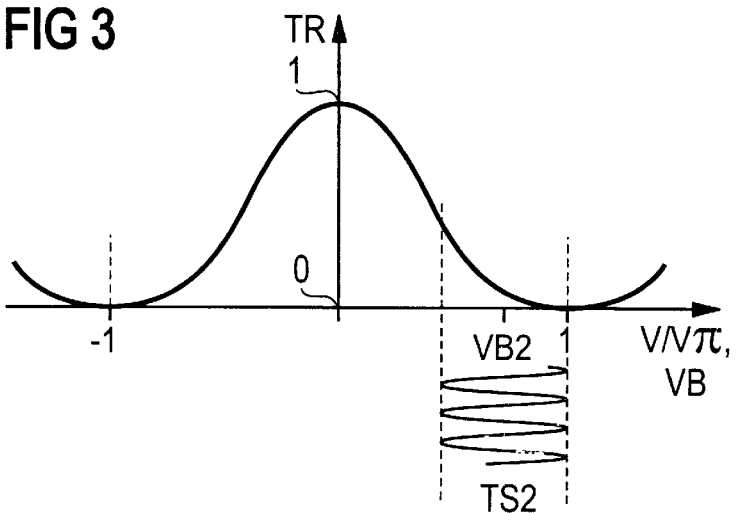

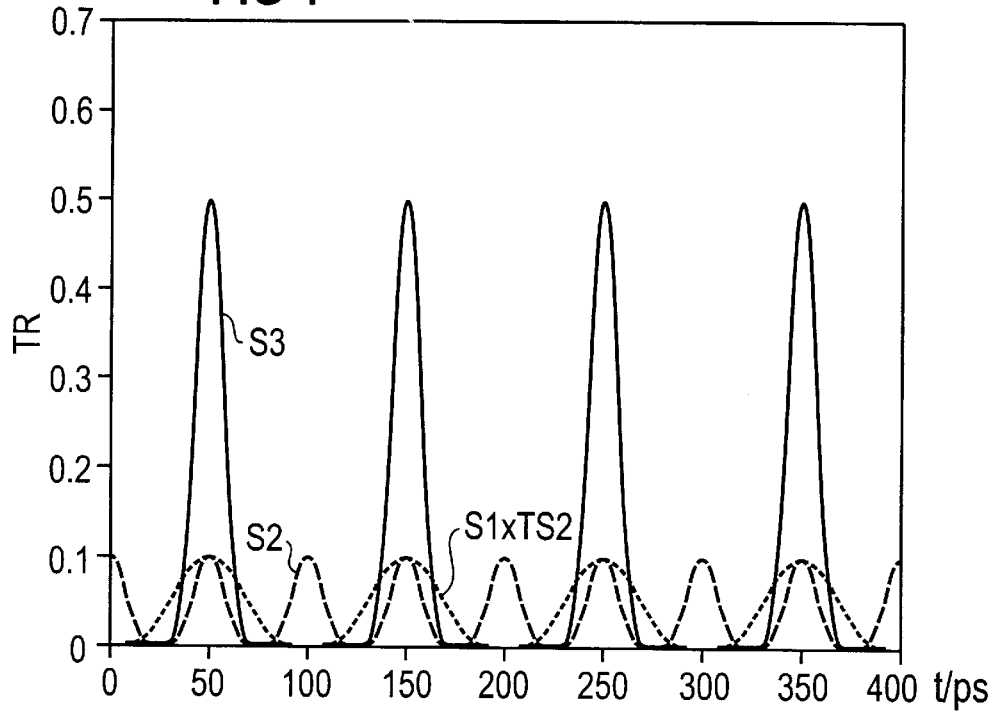
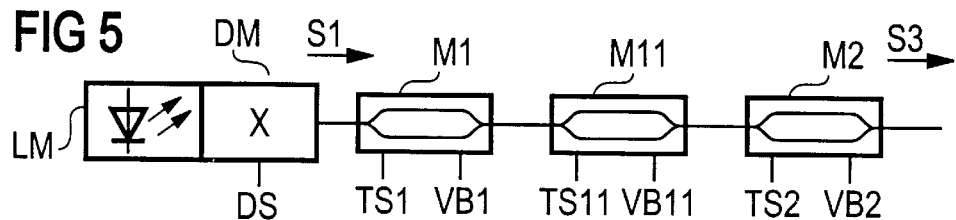
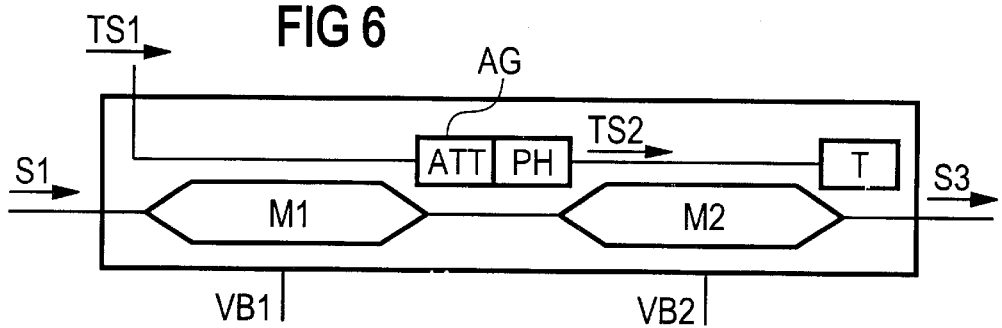

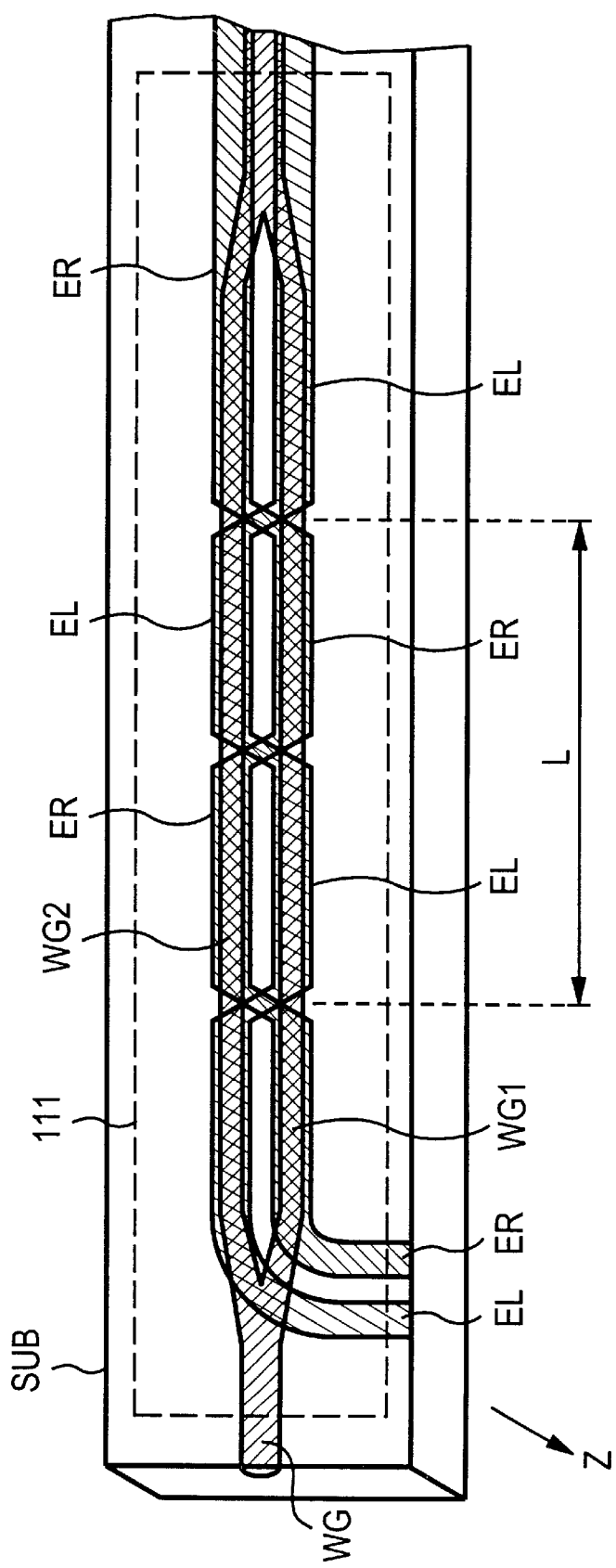

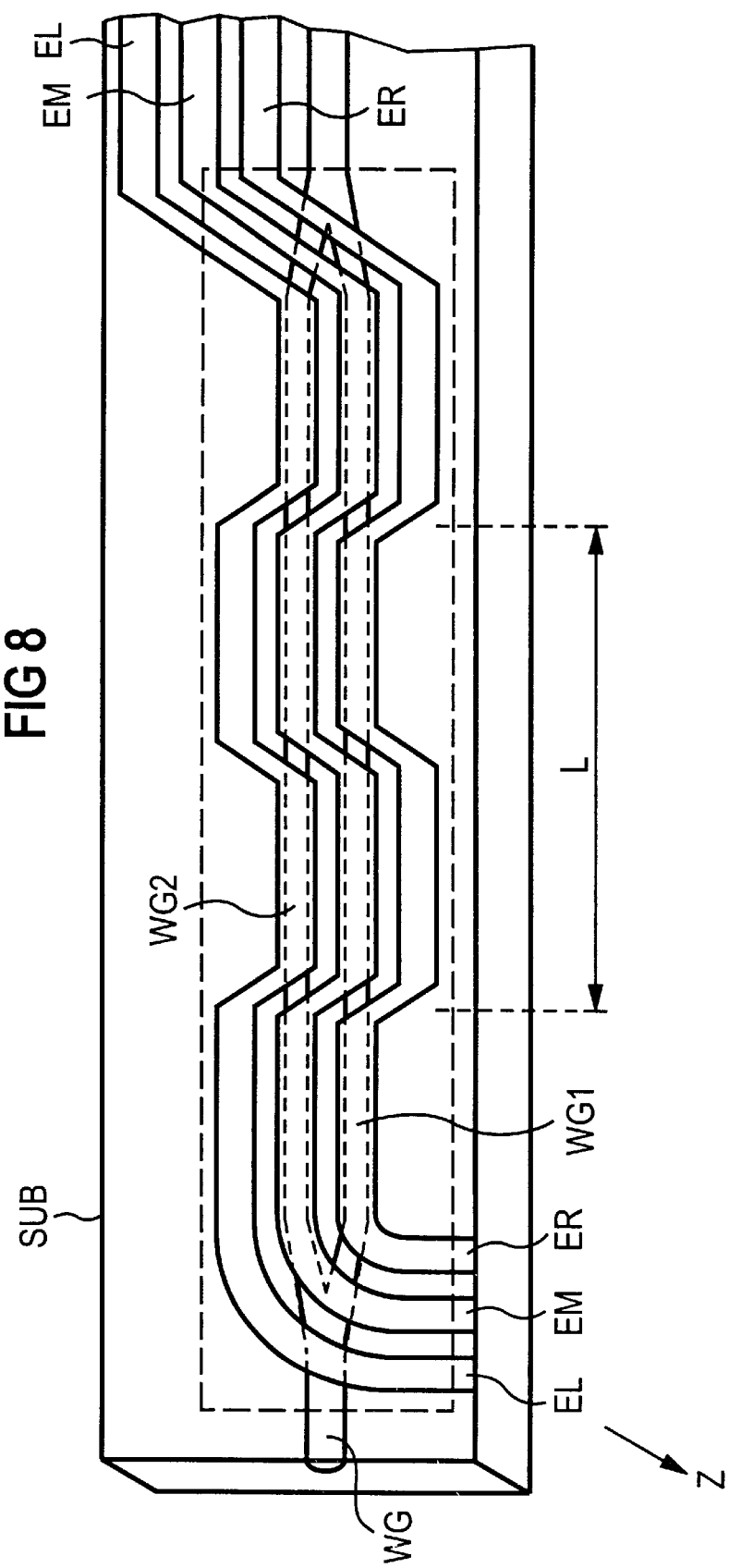

METHOD AND SYSTEM FOR GENERATING RETURN-TO-ZERO SIGNALS

CLAIM FOR PRIORITY

This application claims priority to International Application No. PCT/DE00/01564, which was published in the German language on May 17, 2000, and claims priority to German Application No. 19924347.6, filed May 27, 1999, and German Application No. 19936075.8, filed Jul. 30, 1999.

TECHNICAL FIELD OF THE INVENTION

The present invention relates to a method and system for generating RZ signals.

BACKGROUND OF THE INVENTION

A group of optical transmission systems which operate with high data rates requires sequences of short pulses which are denoted as RZ (return to zero) pulses. An optical pulse can in this case represent a logic 1, while a missing pulse corresponds to a logic 0 of a binary signal.

Patent DE 44 41 180 C1 discloses generating pulses by means of a ladder network of two modulators driven by sinusoidal voltages, which are operated at different frequencies. A frequency divider required to generate the second drive signal is disadvantageous and requires both modulators to be driven with high powers.

Generating short pulses has been disclosed in U.S. Pat. No. 4,505,587, in which ultrashort pulses are generated with the aid of a multiplicity of modulators, the frequencies of the drive signals being doubled in each case.

The generation of short optical pulses with the aid of phase-shifted voltages on the same frequency is known from Electronic Letters Aug. 5, 1993, Vol. 29, No. 16, pages 1449 to 1451. This phase shift must be exactly if the peak pulses are to have a constant shape.

SUMMARY OF THE INVENTION

In one embodiment of the invention, there is a method for generating RZ signals comprising feeding an optimal signal to a first modulator which has at least a first operating point for a first drive signal, wherein a transmission has a maximum, and the transmission has at least a minimum at peak values of a first drive signal; and feeding the optimal signal to a second modulator which has at least a second operating point which is spaced from a third operating point associated with the minimum transmission by ¼ of the spacing between the operating points associated with a maximal and neighboring minimal transmission (1, 0) and the second modulator is fed a second drive signal having a amplitude is selected such that its peak values lie at least approximately for driving purposes between a minimum value of the transmission and half of the maximum value of the transmission.

In one aspect of the invention, the modulation is performed in Mach-Zehnder modulators.

In another aspect of the invention, in order to shorten the RZ pulses at least one additional modulation of the optical signal is carried out using at least one additional drive signal, the additional drive signal being at twice the frequency of the preceding drive signal.

In another aspect of the invention, the optical signal is modulated in binary fashion and feed to the series circuit of the first and second modulators.

In another aspect of the invention, a spatially periodic change to the sign of the modulated optical signal is preformed in one of the first or second modulators, a period length multiplied by an absolute value ($|1/Vel-1/Vopt|$) of the difference ($1/Vel-1/Vopt$) between the inverse ($1/Vel$) of a propagation rate (Vel) of the first and second drive signals and an inverse ($1/Vopt$) of a propagation rate (Vopt) of the optical signal yields at least approximately an inverse ($1/Fel$) of an electric modulation frequency (Fel).

In another embodiment of the invention, there is a system for generating RZ signals with a plurality of series-connected modulators which are fed an optical signal comprising a series circuit having at least two modulators, the modulators are fed signals having the same frequency but different effective amplitudes with a ratio of 1:4, wherein the at least two modulators have different operating points, a transmission having a maximum at one operating point, and the other operating point being selected such that the transmission has a minimum value only at a peak value of the second drive signal.

In another embodiment of the invention, there is a system for generating RZ signals comprising at least two series-connected modulators are integrated on a chip which are fed an optical signal, wherein a electric drive, signal is routed through the modulators; and a matching element located between the modulators to provide amplitude and/or phase matching.

BRIEF DESCRIPTION OF THE DRAWINGS

The invention is explained in more detail with the aid of figures, in which:

FIG. 1 shows the block diagram of an arrangement for carrying out the method.

FIG. 2 shows a diagram for explaining the function of the first modulator.

FIG. 3 shows a diagram for explaining the function of the second modulator.

FIG. 4 shows a diagram for explaining the overall arrangement.

FIG. 5 shows a development of the arrangement, and

FIG. 6 shows an advantageous arrangement with two modulators integrated in a chip.

FIG. 7 shows a Mach-Zehnder modulator with periodic electrode designs, and

FIG. 8 shows a further Mach-Zehnder modulator with periodic electrode designs.

DETAILED DESCRIPTION OF THE PREFERRED EMBODIMENTS

The invention specifies a method and an system for generating optical pulses that are as constant as possible.

In the invention, the second drive signal requires a low drive voltage, and thus a low power. Disregarding different amplitudes—the same drive signal can be used for both modulators. The phase relationship between the two drive signals is relatively uncritical, moreover.

FIG. 1 shows a series circuit of a laser module LM which can also include a data modulator DM, to which a binary DS is fed. Two modulators M1 and M2 are connected in series with the laser modulator LM. Components such as amplifiers or filters that are not essential to the invention are not illustrated. The output signal of the laser module S1 will typically be an optical signal modulated in a binary fashion (on/off). However, if the arrangement is used to generate an optical pulse train, it is possible to dispense with the data modulator and to feed a continuous optical signal as input signal S1 to the first modulator. The further diagrams assume that the optical signal is present.

A first drive signal TS1, which has a sinusoidal or quasi-sinusoidal profile, is fed to the first modulator M1. Other profiles (i.e. shapes) may also be used; but these place increased requirements on the bandwidth of the arrangement. As illustrated in FIG. 2, the operating point of the first modulator is fixed by a first bias (bias voltage) VB1 (normalized in the figure and referred to the maximum of the transmission) such that the transmission (transfer function) of the first modulator reaches at least approximately a maximum. This corresponds to the normalized transmission value TR of 1. The amplitude of the first drive signal is selected such that the minimum transmission value, in this embodiment 0, is reached in each case at the peak values of the drive voltage. This is the case in the case of a normalized drive voltage V/V $\pi$ for ±1 (and is repeated periodically). The result of the first modulation, the output signal of the modulator M1, the second signal S2, has twice the frequency of the drive signal TS1 and is illustrated in the timing diagram FIG. 4 by dashes. As illustrated in FIG. 3, the second modulator M2 is driven by a second drive signal TR2 of the same frequency but—for the same modulators—has at least approximately ¼ of the amplitude of the first drive signal. The operating point VB2 is situated in this case at a spacing of ¼ V/V $\pi$ of the normalized drive voltage from the voltage value V/$\pi$=1 at which the transmission has the minimum value 0; for V/V$\pi$=¾ in FIG. 3.

In FIG. 4, there is a function S1×TS2, which the second modulator would supply if it is fed a constant input signal. However, since it receives the second signal S2 as an input signal, the resulting signal S3 is yielded as the product. The numerical values specified in the figure correspond to an exemplary embodiment in which additional amplifiers are inserted. Of course, the modulators can be connected in any desired sequence.

A shortening of the pulses of the output signal S3 can be achieved when the first modulator M1 is correspondingly supplemented by at least one further modulator. This can be supplemented, in accordance with U.S. Pat. No. 4,505,587, by additional modulators which are fed drive signals with multiple frequencies. One additional modulator M11 is added in FIG. 5.

In order to avoid frequency change—chirp—by the modulators, it is preferable to use two-beam interferometers in which the phase modulation in one arm is equal to the negative of the phase modulation in the other arm. This is achieved, for example, by means of Mach-Zehnder interferometers in which the modulating components of the electric fields (on the basis of electrode geometry) and optical fields (on the basis of waveguide geometry) have a common, longitudinally running plane of symmetry.

In one embodiment, it is advantageous that at least two modulators M1 and M2 are implemented in a chip in accordance with FIG. 6, the electric drive signal TS1 being routed in series through both modulators (travelling wave principle). The propagation rates of the drive signal and of the optical signal are matched to one another in this case as readily understood by the skilled artisan. The slight attenuation of the drive signal in the first modulator permits a second modulator to be driven by the drive signal fed through. Connected between the two modulators, in the signal path of the drive signal, is a matching element AG which ensures the required attenuation and, if appropriate, phase shift (D+PH). The electric signal can be terminated internally or externally with the aid of a terminating element. In another embodiment, it is possible to provide phase matching between the driver signal and the light wave in the module. Of course, additional components can be arranged in the chip as readily understood by the skilled artisan.

Each modulator has for the optical input signal S1 or S2 two different paths whose propagation times can be influenced by electric voltages. If the propagation times are equal (V/V $\pi$=0, . . . ), the two component waves add together. Whereas, if the propagation times are different by 180° ($\pi$) of the input signal, they then supplement one another to form 0. The modulators are frequently designed such that the propagation time of one signal path is shortened by the drive voltages, and that of the second signal path is lengthened. The biases can also be generated internally.

Attenuation can be dispersed with in the matching element AG by making the second modulator less sensitive than the first. This is accomplished by selecting the length of the Mach-Zehnder interferometer M2 to be shorter than that of the Mach-Zehnder interferometer M1; in the ideal case of non-attenuated electrodes, the electrooptic interaction length in M2 would be four times as short as in M1.

In order to optimize the modulation efficiency, matching is dispersed with respect to the propagation rates of the optical and electrical waves. In such cases, the optical wave and electric modulation phase should be ensured not to run apart. A spatially periodic reversal of the electric field of the drive signal is suitable for this purpose.

This is illustrated in FIG. 8 using the example of the Mach-Zehnder interferometer M1.

The interferometer is accommodated on a lithium niobate substrate SUB. The optical axis Z runs perpendicular to the plane of the drawing, this also being termed the Z section. It comprises a waveguide WG, which is split up in the region of the modulator M1 into two arms WG1, WG2, and electrodes EL, EM, ER. The radio-frequency control signal is fed at an electrical input EE into the coplanar line formed by the electrodes EL, EM, ER. In this case, EL, ER are the ground electrodes, and EM bears the drive signal TS1. The coplanar line subsequently runs to the matching element AG and modulator M2. The middle electrode runs with a spatial period L in stretches of length L/2 in an alternating fashion over the waveguide arm WG2 and the waveguide arm WG1. A ground surface, that is to say one of the two ground electrodes EL, ER of the coplanar line, is situated in these regions in an alternating fashion over the respective other waveguide arm. In this way, the electric field of the electrodes runs periodically with the period L. The aim is to modulate the optical wave in the same direction as far as possible everywhere during the traversal of the wave guide arms WG1, WG2. For this purpose $$L*|1/Vel-1/Vopt|=1/Fel.$$

Where L is the spatial period, Vel is the electric propagation rate in the copolanar waveguide, Vopt is the optical propagation rate, and Fel is the electric modulation frequency The electric and optical waves usually run in the same direction, and so Vel and Vopt have the same sign. However, it is also possible to allow the electric and optical waves to propagate in opposite directions. In this case, a much smaller value is to be selected for L, and a smaller electric modulation bandwidth results (around Fel). When use is made of two cascaded Mach-Zehnder interferometers M1, M2, which are operated at the same frequency, an electric signal may be fed in the middle between the two interferometers. In this case, the first interferometer M1, which is traversed by the optical wave, would need to be operated with an electric wave running counter to the optical wave, and the second interferometer M2 would need to be operated with a synchronized electric wave.

Finally, a Mach-Zehnder interferometer M1 with a symmetrical line including electrodes EL, ER is illustrated in FIG. 7. In order to achieve the periodic electrode structure, electrode crossovers are provided by means of an insulating interlayer or by bonding wires.

Finally, the housing enclosing the modulator can be designed as a high-frequency resonator in order to minimize the need for control power.

What is claimed is:

1. A method for generating RZ signals comprising:

feeding an optimal signal to a first modulator which has at least a first operating point for a first drive signal, wherein a transmission has a maximum and the transmission has at least a minimum at peak values of a first drive signal; and feeding the optimal signal to a second modulator which has at least a second operating point which is spaced from a third operating point associated with the minimum transmission by ¼ of the spacing between the operating points associated with a maximal and neighboring minimal transmission and the second modulator is fed a second drive signal having a amplitude is selected such that its peak values lie at least approximately for driving purposes between a minimum value of the transmission and half of the maximum value of the transmission.

2. The method as claimed in claim 1, wherein the modulation is performed in Mach-Zehnder modulators.

3. The method as claimed in claim 1, wherein in order to shorten the RZ pulses at least one additional modulation of the optical signal is carried out using at least one additional drive signal, the additional drive signal being at twice the frequency of the preceding drive signal.

4. The method as claimed in claim 1, wherein the optical signal is modulated in binary fashion and feed to the series circuit of the first and second modulators.

5. The method as claimed in claims 1, wherein a spatially periodic change to t sign of the modulated optical signal is preformed in one of the first or second modulators, a period length multiplied by an absolute value ($|1/Vel-1/Vopt|$) of the difference ($1/Vel-1/Vopt$) between the inverse ($1/Vel$) of a propagation rate (Vel) of the first and second drive signals and an inverse ($1/Vopt$) of a propagation rate (Vopt) of the optical signal yields at least approximately an inverse ($1/Fel$) of an electric modulation frequency (Fel).

6. The arrangement as claimed in claim 5, wherein Mach-Zehnder modulators are provide.

7. A system for generating RZ signals with a plurality of series-connected modulators which are fed an optical signal, comprising:

a series circuit having at least two modulators, the modulators are fed signals having the same frequency but different effective amplitudes with a ratio of 1:4, wherein the at least two modulators have different operating points, a transmission having a maximum at one operating point, and the other operating point being selected such that the transmission has a minimum value only at a peak value of the second drive signal.

8. The arrangement as claimed in claim 7, wherein at least two modulators are integrated on a chip, and in the electric drive signal is routed through both modulators, a matching element being provided between the modulators for the purpose of amplitude and/or phase matching.

9. The system as claimed in claim 7, wherein one of the modulators has spatially periodic control electrodes, a period length multiplied by an absolute value a ($|1/Vel-1/Vopt|$) of a difference ($1/Vel-1/Vopt$) between the inverse ($1/Vel$) of a propagation rate (Vel) of the drive signal and an inverse ($1/Vopt$) of a propagation rate (Vopt) of the optical signal yields at least approximately an inverse ($1/Fel$) of an electric modulation frequency (Fel).

* * * * *